UNITED STATES PATENT OFFICE.

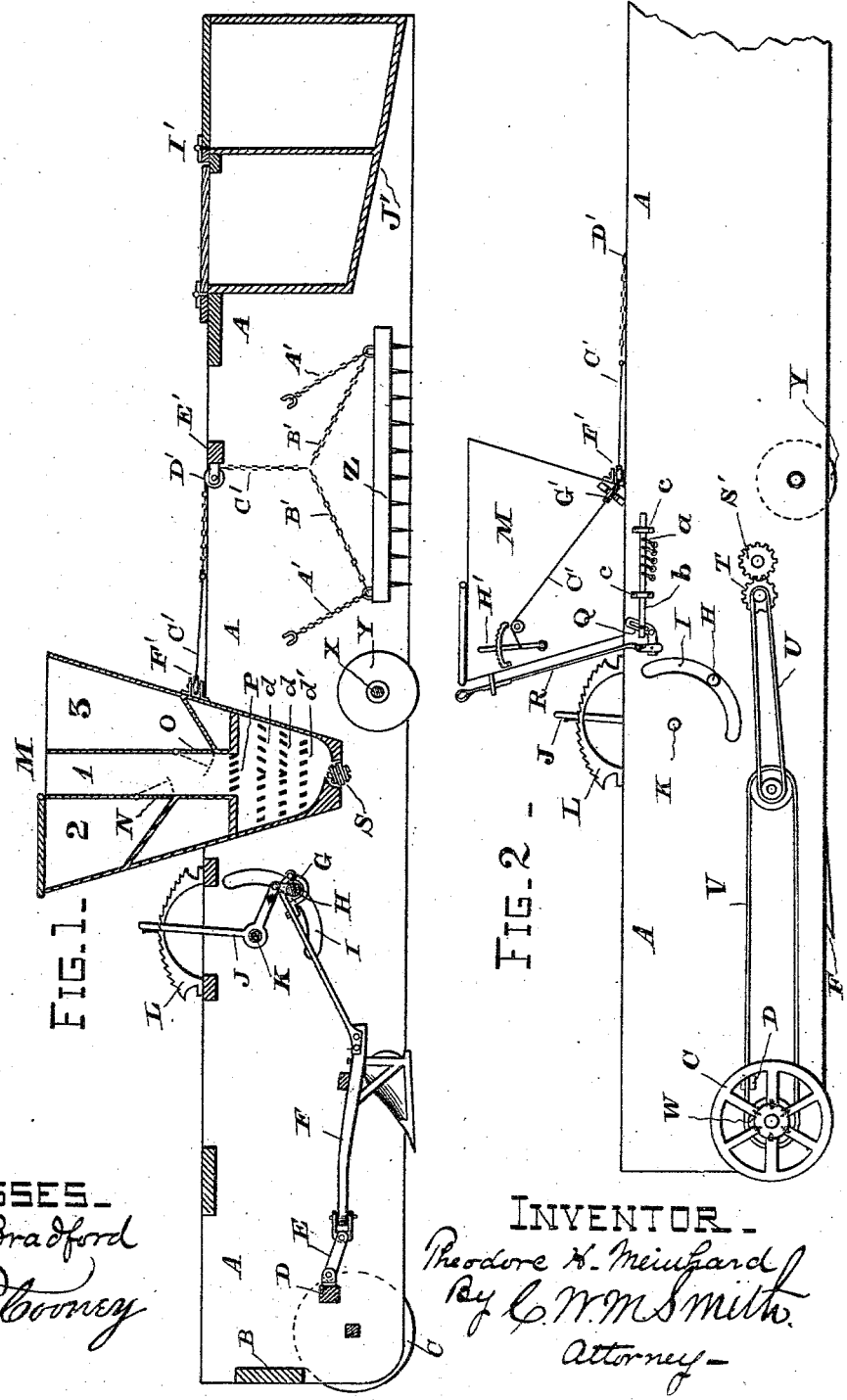

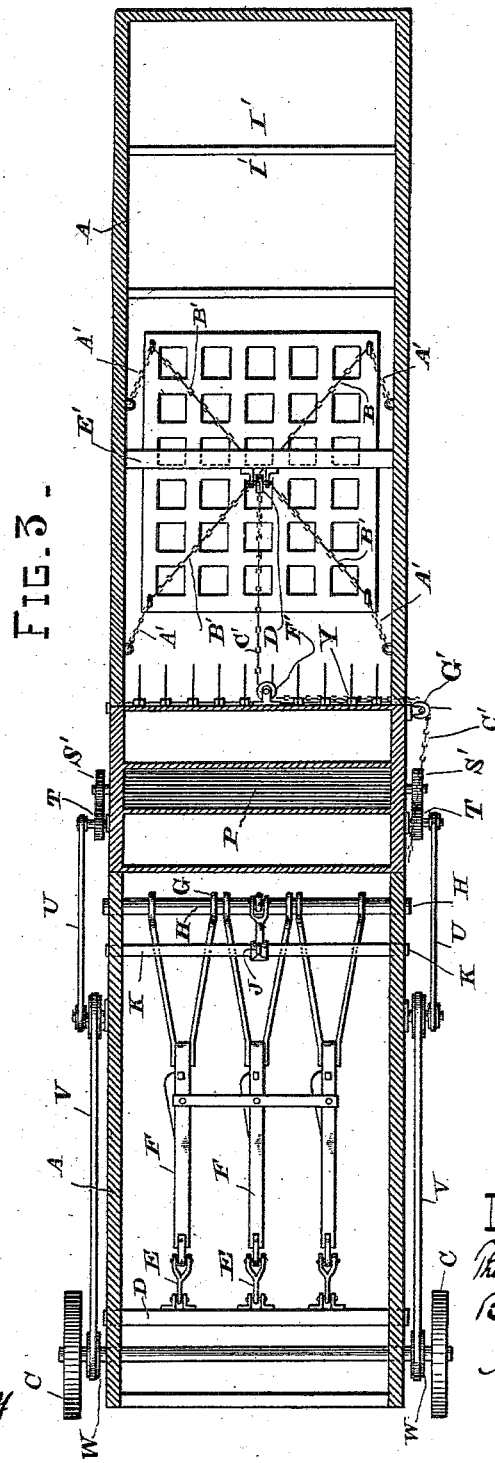

THEODOR H. MEINHARD, OF SAN FRANCISCO, CALIFORNIA.

COMBINED AGRICULTURAL IMPLEMENT.

SPECIFICATION forming part of Letters Patent No. 301,384, dated July 1, 1884.

Application filed January 31, 1884. (No model.)

*To all whom it may concern:*

Be it known that I, THEODOR H. MEINHARD, a subject of the Emperor of Germany, residing in the city and county of San Francisco and State of California, have invented certain new and useful Improvements in Combined Agricultural Implements, of which the following is a specification.

My invention relates to an improved combined agricultural implement adapted for the planting of cereals; and the object of my improvement is to provide a machine whereby the plowing of the ground, the sowing of the grain, the harrowing, and the smoothing or leveling of the surface of the ground may all be accomplished at one operation. I accomplish this object by the mechanism illustrated in the accompanying drawings, in which—

Figure 1 is a longitudinal sectional view of my improved combined agricultural implement. Fig. 2 is a side view of the same, the rear portion of the machine being broken away. Fig. 3 is a sectional plan view.

Similar letters of reference are used to designate like parts throughout the several figures.

The operating parts of my machine are contained within a rectangular frame, A, which may be built solidly or of an open frame-work, the sides and top of which should be braced and stayed in a substantial manner, and may be constructed of either wood or metal.

A transverse bar, B, to which the animals are hitched, extends across the front part of the machine; and a pair of wagon-wheels, C C, are likewise attached to the forward end of the machine, for the purpose of lifting the forward end of the side frame from the surface of the ground. Just back of the axle of these wheels I place a transverse bar, D, to which are pivoted links E, connected to the clevis of the plows F; and as many plows may be employed as desired, arranged side by side at proper intervals apart.

The handles of the plows are connected by a hinge-loop, G, to the transverse rod H, which has its bearings in a segmental slot, I, cut or formed in the sides of the main frame A. This plow-handle rod H is moved up or down by means of a bent lever, J, pivoted to a transverse rod, K. The upper end of the lever extends above the top of the main frame, and is provided with a pawl or catch which engages with the curved ratchet L, as shown in Fig. 1, for the purpose of retaining the plow-handles at any desired elevation. By raising or depressing the rod to which the plow-handles are attached the point or share of the plow will be caused to take a less or a greater "bite" on the land, as may be desired.

The feed-box M is placed about midway of the length of the main frame and extends across it from side to side, and is formed into three compartments. (Shown in Fig. 1.) The central compartment (designated by the figure 1) discharges the grain directly to the feeding or distributing roller; and as the supply of grain contained within this compartment becomes exhausted, the pressure of the mass of grain will be removed from the outwardly-opening flap-door N, leading from compartment 2, and the pressure of the grain within will cause this door to open, and the grain contained therein will then pass into compartment No. 1. When this supply becomes nearly exhausted, the flap-door O in compartment 3 will then open and discharge a third body of grain upon the distributing-roller. The bottoms of compartments Nos. 2 and 3 are made slanting down toward the bottom of the flap-doors, so as to facilitate the outward passage of the grain. The bottom of compartment No. 1 is floored or covered by a series of slats, P, whose pintles are journaled in the sides of the main frame, and they are all provided upon one end with crank-arms $a$, pivoted in a sliding horizontal rod, $b$, held in brackets $c$, and caused to move back and forth, to open and close the slats or grain-passage, by means of a slotted lever, Q, engaging with a pin upon the end of the rod $b$, and pivoted to the side of the frame and operated by a pull-rod, R, extending up within convenient reach of the driver, who sits upon the top of the feed-box. After the grain passes through the slotted gate it falls upon a series of fixed slats, $d\ d\ d$, placed transversely across the hopper, which causes the grain to be more evenly distributed. The lowermost of this series of fixed slats are inclined so as to throw the grain toward the rear end of the feed-box, in the bottom of which is placed a fluted feed or distributing roller, S, the shaft of which extends through the sides of the frame, and is provided upon both ends with gear-wheels S' S', which are engaged by the spur-gears T T, driven by belt-connections U V, with pulleys W W upon the hubs of the wagon-wheels C, and it is by this means that revolution is imparted to the seed or feed roller, and a certain quantity of grain is permitted to drop from the hopper upon the ground at regular intervals of time, varying with the speed with which the machine is drawn over the ground.

In the rear of the seeder I place a rod, X, carrying the disk-colters Y, which slice up the clods of earth preparatory to their being acted upon by the harrow Z, which is held between the sides of the main frame by the stay-chains A' A', extending from each of the four corners of the harrow. Other chains or ropes, B' B', are made fast to each of the four corners of the harrow, and meet at a point directly over the center thereof, where they are made fast to a single line or chain, C', which passes over a pulley, D', attached to a cross-bar, E', and from thence around the pulley F', attached to the rear of the seed-box, and then over a pulley, G', attached to the rear corner of the feed-box, and thence up and over a small roller, and made fast to the pivoted lever-arm H'. By throwing this lever down the harrow may be raised clear of the surface of the ground.

At the rear end of the machine I build a bin or box, I', which may for convenience be divided into compartments, as shown, and adapted for the reception of a supply of grain for the seed-sower. The bottom of this grain-bin closely approaches the ground and is made inclined from the front edge downward toward the rear, the object being to provide a "smoother" or clod-crusher, J', to smooth off and level the surface of the ground after it has been acted upon by the harrow, and thereby render it more easy to drive over during the process of harvesting the crop.

If desirable, wagon-wheels may be placed at the rear end of the carrying-frame, although under ordinary conditions they may be dispensed with, and the rear end of the sideboards of the frame is permitted to drag upon the surface of the ground.

Having thus described my invention, what I claim, and desire to secure by Letters Patent, is—

In a combined agricultural implement, the combination, with the adjustable plows, the feed box or hopper M, the feed-roller S, operated by a belt-connection with the forward carrying-wheels, C C, and the harrow Z, of the disk-colters Y, and clod-masher J', all when constructed, combined, and arranged to operate substantially in the manner and for the purpose set forth and specified.

In testimony that I claim the foregoing I have hereunto set my hand and seal.

THEODOR H. MEINHARD. [L. S.]

Witnesses:
WILMER BRADFORD,
C. W. M. SMITH.